United States Patent [19]

Radke

[11] 3,756,620
[45] Sept. 4, 1973

[54] CUSHION WITH RESTRAINING BANDS
[75] Inventor: Donald G. Radke, Troy, Mich.
[73] Assignee: Allied Chemical Corporation, New York, N.Y.
[22] Filed: Aug. 12, 1971
[21] Appl. No.: 171,226

[52] U.S. Cl. .......................... 280/150 AB, 244/121
[51] Int. Cl. ............................................. B60r 21/08
[58] Field of Search .......................... 280/150 AB; 102/37.1; 46/87, 88, 89; 244/146, 140, 138, 121

[56] References Cited
UNITED STATES PATENTS

| | | | |
|---|---|---|---|
| 3,638,755 | 2/1972 | Sack | 280/150 AB |
| 3,586,347 | 6/1971 | Clrey | 280/150 AB |
| 3,591,201 | 7/1971 | Brawn | 280/150 AB |
| 3,618,979 | 11/1971 | Gulette | 280/150 AB |
| 3,552,770 | 1/1971 | Berryman | 280/150 AB |
| 2,041,737 | 5/1936 | Beal | 46/87 |
| 1,725,831 | 8/1929 | Sherman | 46/87 |

Primary Examiner—Kenneth H. Betts
Assistant Examiner—John P. Silverstrim
Attorney—Jonathan Plaut

[57] ABSTRACT

Air cushion means including the restraint attached thereto which absorbs energy and deploys the cushion in the desired position.

9 Claims, 4 Drawing Figures

PATENTED SEP 4 1973

3,756,620

INVENTOR.
DONALD G. RADKE

BY:

ATTORNEY.

CUSHION WITH RESTRAINING BANDS

This invention relates to energy absorption in a passenger restraint system as a result of the use of application to an energy-absorbing cushion or bag of energy directing restraint, in the form of elastic material attached to the cushion or sewn therein, for example, for directing the cushion downward. More specifically, this invention relates to the introduction of an energy-absorbing elastic material attached to and outside of an air cushion, or sewn thereinto to effectively restrain forward motion of a passenger within a motor vehicle. Particularly, the energy-absorbing elastic barrier acts to dissipate and direct the total amount of energy of the fluid material which inflates the passenger restraint air cushion.

In the case of gas cushion inflation on impact of the motor vehicle, injury may be caused under some circumstances to the occupants due to the relatively large magnitude of momentum imparted against the occupant by the rapidly inflating gas cushion, if the cushion is directed or rides upwardly towards the head of the occupant. This is especially significant when the occupant is a child and may, in fact, be standing at the time of impact. If the cushion inflates and rides upon the child so as to strike his head, for example, serious injury may result. In this situation, a direction of the cushion downward, together with effective energy absorption, results in a safer disposition of the cushion in the car. This is all particularly useful in the case of a standing child in the right front passenger seat (a child standing on the floor in front of the dash panel).

Objects and advantages of the invention will become apparent in the context of the following more detailed description of the invention.

BRIEF DESCRIPTION OF THE INVENTION

Generally, energy-absorbing and directing means are provided as a part of a passenger restraint cushion, typically to be found within an automobile. The energy-absorbing and directing means is in the form of an elastic panel or band covering and permanently attached to the outer or inner surface of the passenger or driver restraining cushion. The passenger or driver restraining cushion may be porous so that gas entering into it will be emitted therethrough, and it may also be elastic. This energy-absorbing, elastic panel or band, due to its elastic quality, expands with and takes the shape and meets the volume of the fully inflated cushion. The absorption of energy by the panel or band, as a result of its elastic movement under the pressure of the energy entering into the restraining cushion, serves to dissipate the total amount of said energy over a period of time (and reduces the peak decibel level of said energy.) Additionally, when the energy of the inflating material is directed against the wall of the restraining cushion, the resistance offered by the stretching of the band or outer panel where it is attached to the restraining cushion serves to direct the movement of the cushion toward areas where the panel or band is not attached thereto, thus directing the cushion in one embodiment downward, as will be more fully described.

Alternately, in one embodiment, the energy-absorbing and directing barrier may be in the form of elastic or non-elastic stitching permanently stitched in the restraining cushion.

Describing in further detail in relation to the drawings.

DETAILED DESCRIPTION OF THE INVENTION

According to the invention, an inflating medium is obtained from a source 1, as is well known in the art. For example, the inflating medium is gas obtained from either a gas generator system or a compressed gas source, or a combination of the two. The inflating medium is directed, at least partially, into a restraining cushion 4. On said cushion is attached or connected energy-absorbing elastic restraint 2, in the form of a band or panel.

In the embodiment shown in FIGS. 1, 2, 3 and 4, all of the inflating material is directed into the cushion 4.

Figure 1:
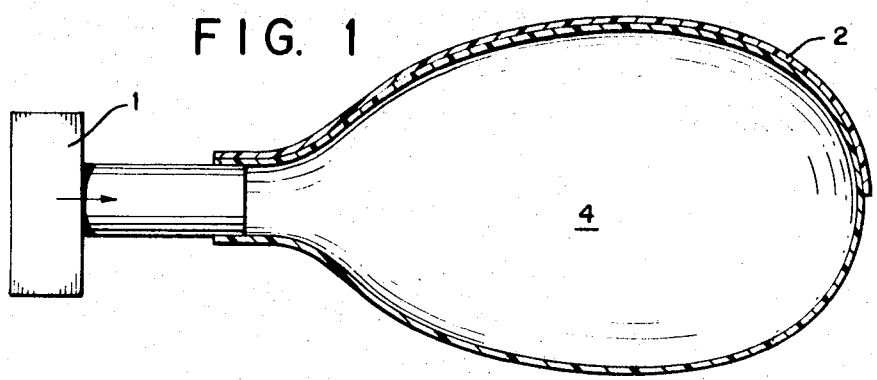
FIG. 1 shows the embodiment of the invention with a restraining cushion with energy-absorbing elastic restraint thereon.
Figure 2:
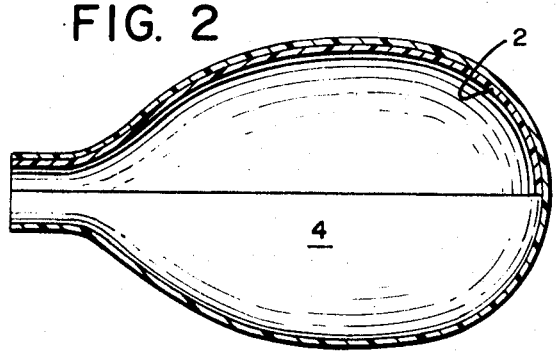
FIG. 2 shows another embodiment of the invention.

In this embodiment of FIG. 1, the restraint 2 is in one embodiment preferably knit and made, for example, of nylon or polyester material. It is attached to the cushion 4 on the cushion's upper and outer extent when deployed, as by adhesive. Other materials may also be utilized. The cushion 4 is preferably elastic, and it may preferably be more elastic than the outer restraint 2 so that a bias means effects expansion of the cushion 4 downward on inflation. The elasticity of the outer restraint thus serves to dissipate and direct the total amount of energy of the gas over a period of time filling the cushion 4. The outer elastic restraint 2 will move in a direction so as to conform to the shape of the cushion as it expands with it. Alternately, the restraint 2 may be placed on the inside of the cushion 4, as shown in FIG. 2.

In the case of the cushion 4, as discussed, as the cushion expands the spaces between the porous material, for example, knitted, will open and movement of inflating material therethrough will occur. The restraint 2 may also be provided with spaces for permeability for fluid flow from the cushion 4 through the restraint 2 for deflation of the cushion.

Figure 3:
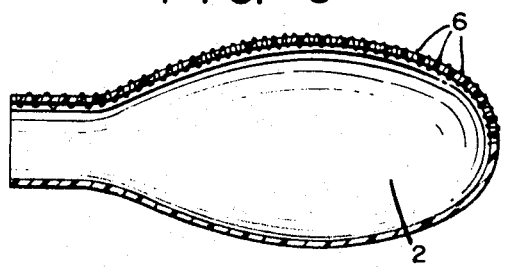
FIG. 3 is another view of the invention.

In FIG. 3, the cushion 4 has stitching 6, preferably elastic, sewn therein which acts as the elastic restraint. The stitching in a like manner holds the portions where it is located from the rate of expansion of the rest of the expandable cushion, thus furnishing energy absorption and direction, as described.

Figure 4:
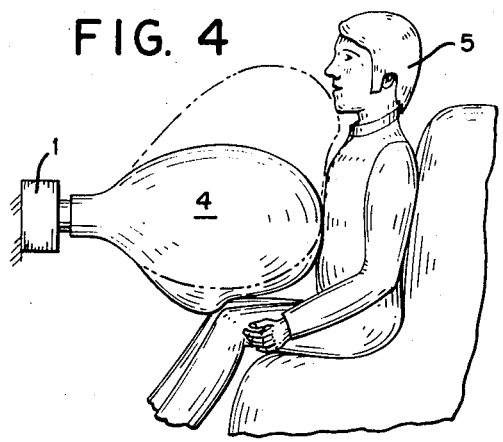
FIG. 4 shows the embodiment of FIG. 1 in position with relation to the passenger.

In FIG. 4, the cushion 4 is shown in its fully deployed position against a passenger for restraint thereof. In phantom is shown the possible position of the cushion against the head 5 of the occupant, absent the directing characteristics of the restraint discussed with relation to FIGS. 1 through 3.

Of course, this invention is not concerned with the use of a lower torso restraint, which also may be employed within the cushion 4 as a matter of choice.

Although the invention has been described with relation to three embodiments, it is understood that the intention is that it only be limited by the scope of the following claims and not the details of the apparatus, materials, or methods of employing them as recited above.

I claim:

1. Air cushion restraint system comprising an energy-absorbing and directing restraint, a passenger restraining cushion deploying toward said passenger on inflation thereof, said restraint permanently attached to said cushion on its upper surface, the cushion being free of the restraint along at least its lower surface, and means for introducing inflating gas into said cushion, said restraint conforming to the shape of said cushion when said gas is introduced thereinto and directing expansion of said cushion downward away from said restraint.

2. Air cushion restraint system of claim 1, said restraint being stitching disposed in said upper surface of said cushion.

3. Air cushion restraint system of claim 1, said restraint being a band of material attached to a surface of said cushion.

4. Air cushion restraint system of claim 3, said band being located on the outside upper surface of said cushion.

5. Air cushion restraint system of claim 3, said band being located on the inside upper surface of said cushion.

6. Air cushion restraint system of claim 5, said band being elastic.

7. Air cushion restraint system of claim 6, said cushion and said band being formed of nylon.

8. Air cushion restraint system of claim 7, said band and cushion being permeable.

9. Air cushion restraint system of claim 1, said stitching being elastic.

* * * * *